United States Patent

[11] 3,628,506

[72] Inventor Jan Willem Cornelis Glasbergen
 Doetinchem, Netherlands
[21] Appl. No. 881,500
[22] Filed Dec. 2, 1969
[45] Patented Dec. 21, 1971
[73] Assignee Domaf N.V.
 Doetinchem, Netherlands
[32] Priority Dec. 4, 1968
[33] Netherlands
[31] 6817418

[54] SUCKLING DEVICE FOR CALVES OR SIMILAR YOUNG CATTLE
 7 Claims, 4 Drawing Figs.
[52] U.S. Cl. ............................................. 119/71, 119/51.11
[51] Int. Cl. ....................................... A01k 09/00
[50] Field of Search ......................................... 119/71, 51.11

[56] References Cited
 UNITED STATES PATENTS
 3,097,627 7/1963 Garcia ............................ 119/71 X
 3,204,607 9/1965 Arnold et al. .................. 119/71 X
 3,421,484 1/1969 Flocchini ........................ 119/71

Primary Examiner—Hugh R. Chamblee
Attorney—Ernest A. Greenside

ABSTRACT: A device for suckling calves and similar young animals, comprising a carriage adapted to be intermittently moved along a row of suckling stations and provided with a supply container, at least one measuring and suckling cup being connected to said container and being vertically movable relative to said container between a lower position in which the supply opening of the cup lies under the (minimum) level of the containers, and an upper position in which said opening is located above the (maximum) level in the container.

3,628,506

SUCKLING DEVICE FOR CALVES OR SIMILAR YOUNG CATTLE

BACKGROUND OF THE INVENTION

1. Field of the Invention

This invention relates to a device for suckling calves and similar young animals. In the fattening of calves and similar young animals e.g. in large fattening houses good fattening results, with a relatively low mortality percentage, may be obtained when the young animals are fed at relatively short time intervals by relatively small quantities of feeding-milk. In particular such a semicontinuous manner of feeding is required when the animals are very young yet.

2. Description of the Prior Art

For the suckling of calves and similar young animals it has been known to use a device, such as described in the U.S. Pat. No. 3,204,607, comprising a carriage adapted to be intermittently moved along a row of suckling stations, said carriage having a supply container to which at least one measuring or suckling cup is connected, the bottom part of said cup being in communication with a suckling point movable along with the carriage. By means of this device the calves may be suckled periodically with accurately measured quantities of feeding-milk. The time during which the carriage is standing at each suckling station is chosen sufficiently long for having the respective calves empty the measuring or suckling cups.

Thereafter the measuring or suckling cups are again filled up to a predetermined level for suckling the next group of calves at the next suckling station. It has appeared that such a method of suckling with predetermined portions of feeding-milk is especially very suitable for very young calves since by this method of feeding the mortality percentage is considerably decreased and also in other aspects better fattening results are obtained. A practical disadvantage of the above-described known device is, however, that the electromagnetic valve provided in the connection conduit between each measuring or suckling cup and the storage reservoir, controlled by a level electrode provided in the cup, constitutes an extra source for the development of the acid producing bacteria as well as for derangements.

SUMMARY

It is a main object of this invention to provide a suckling device for calves and similar young animals, which satisfies the requirements mentioned and which avoids the disadvantages of the well-known devices above referred to.

In accordance with the present invention a device for suckling calves and similar young cattle is provided comprising a carriage adapted to be intermittently moved along a row of suckling stations and provided with a supply container, at least one measuring and suckling cup being vertically movable relative to said container between a lower position in which the supply opening of the cup lies under the (minimum) level of the container, and an upper position in which said opening is located above the (maximum) level in the container, the bottom part of said cup being in communication with a suckling point movable along with the said carriage.

With the device according to the invention each measuring and suckling cup may be (re)filled during the displacement of the carriage from one suckling station to the other in a simple and quick manner viz by moving said cup through a certain distance downwardly and thereafter again upwardly.

When moving the cup downwardly, it is filled automatically up to the level in the supply container which level may vary between a minimum and a maximum value. During the following upward movement the excess quantity of feeding-milk flows back again to the supply container and until the level in the cup has become equal to the lowest point of the supply opening. Thereby a permanently open connection without valves is present between the supply container and all measuring or suckling cups provided.

In a practical embodiment the measuring or suckling cups are supported by a common yoke vertically swingable, the cups being each connected to the supply container by a flexible conduit.

Preferably the measuring or suckling cups are hingedly suspended from one end of the yoke hingedly mounted like a two-armed lever, a lifting magnet being adapted to act upon the other end of the yoke.

According to a further feature of the invention the up and down movement of the supporting yoke is used for agitating the feeding-milk in the supply container and hereby keeping it homogeneous. This feature comprises that in a point situated between the hinge point and an end of the yoke an agitation member from above into the storage reservoir is suspended hingedly from that point.

The invention will be hereinafter further explained by way of example with reference to the accompanying drawings, in which.

Figure 3:
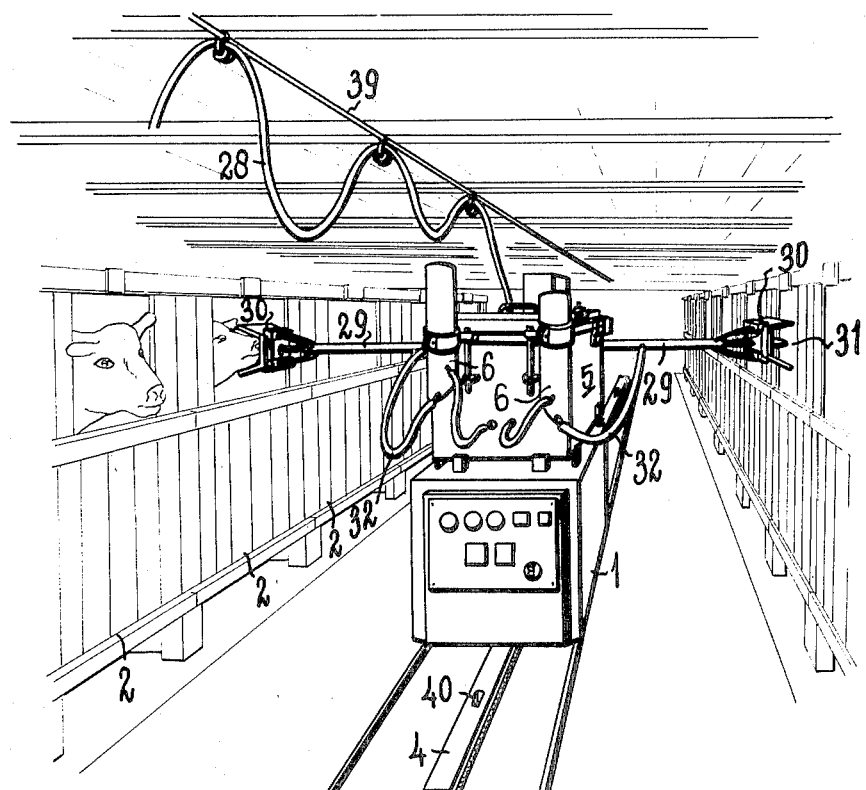
FIG. 3 is a perspective view of the container according to FIG. 2.

The suckling device as shown in the drawings comprises a carriage 1 which is intermittently movable supported on a rail 4 mounted between two rows of calf-pens 2 of the cow-house floor 3. In the lower part of the carriage the different members for the electric drive of the carriage are provided such as a drive motor, switches, time-relays a.s.o. which members will be further explained with reference to FIG. 4.

Figure 1:
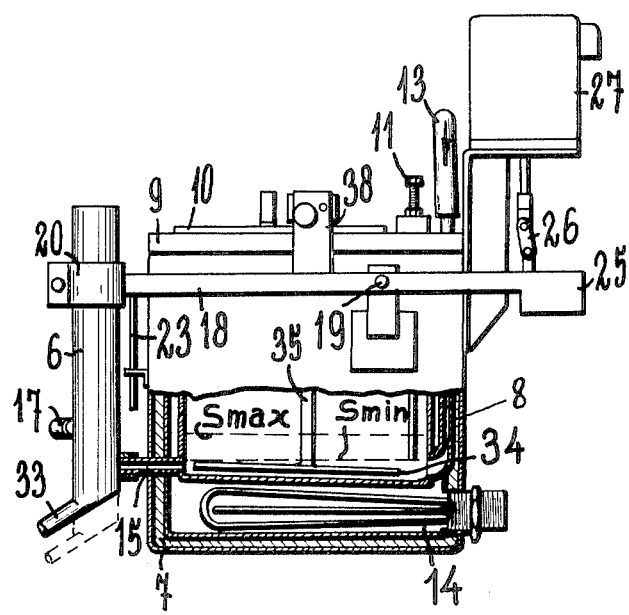
FIG. 1 is a perspective view of the suckling device according to the invention.

On the carriage 1 there has been provided the part of the device to which the invention relates specially, namely the supply container 5 with the corresponding measuring cups or suckling cups 6. The container 5 presents a heat-isolating outer jacket 7, within which an inner tub 8 is provided, constituting the container proper (FIG. 1). The intermediate room between the outer jacket 7 and the inner tub 8 is closed by an edge portion 9 at the upper side and the inner tub 8 is closed by a cover 10. In a portion of the edge part 9 extending to above the inner tub 8 two measuring electrodes 11 have been mounted, adjusted to a minimum level and a maximum level respectively for the feeding-milk in the tub 8, which electrodes are connected by conductors 12 to a control circuit, not illustrated, containing an electromagnetically controlled valve by means of which the container 5 may be supplied from a feeding-milk preparation-installation not shown which is stationary. The filling device for the container 5 has been designated 13. The level control of the container 5 and the said stationary preparation-installation do not constitute part of the invention and are therefor not described nor illustrated.

In FIG. 3 the flexible connection conduit 28 between the preparation-installation, not shown, and the container 5 has been shown which conduit is suspended from the ceiling of the cow-house in the form of a couple of slings which are shiftable along a suspension rail and may be extended or folded as necessary. In the room below the inner tub an electrical heating-element 14 is provided by means of which the room between the outer jacket 7 and the inner tub 8, filled with a heat-transmitting liquid may be kept at a desired temperature and thereby the feeding-milk contained in the inner tub. From a point near the bottom of the inner tub 8 two discharge pipes 15 extend in the embodiment shown through the outer jacket 7 to the outside, the ends of which are each via flexible conduits 16 connected to a connecting sprout 17 of a cup 6. The cups 6 are hingedly suspended from the one end of a yoke 18 in the form of a frame, said yoke being mounted like a two-armed lever around pivots 19 (only one being shown in the drawings) to two opposite walls of the outer jacket of the container 5. The cups are each surrounded by a strap 20 provided with a projecting pivot 21 journaled in a projecting part 22 of the yoke 18. The pivots 21 each present a guide pen 23 directed vertically downwards, said pen being shiftable through a bracket 24 secured to the relative end wall of the container 5 in order to keep the related cup 6 almost vertical when pivoting around the pivots 19 of the yoke 18. The end 25 of the yoke 18 remote from the cups 6 constitutes a counterweight and is coupled by a hinged connection rod 26 to the armature not shown of an electromagnet 27.

Figure 2:
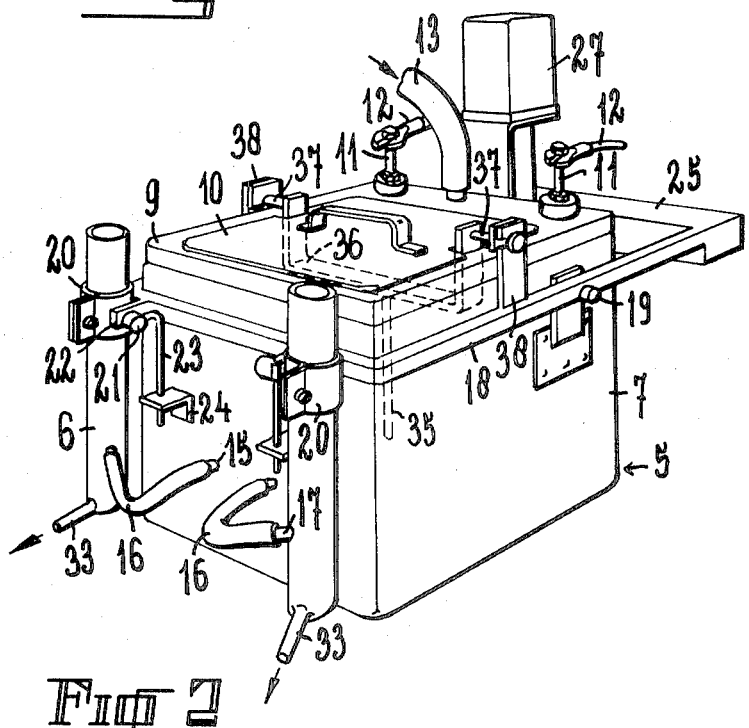
FIG. 2 is a side elevation of the supply container with the measuring cups.

Influenced by the counterweight 25 the yoke 18 normally has the position shown in FIG. 1 and 2 corresponding to the upper position of the cups 6. When energizing the electromagnet 27 the yoke end 25 constituting the counterweight is drawn upwards by which the yoke pivot 5 around the pivots 19 and the cups 6 are moved to their lower position shown in broken lines in FIG. 1. In this last-mentioned position the supply opening of the cup provided by the connection sprout 17 lies under the minimum level Smin in the inner tub 8, so that in this lower position of the cup 6 always feeding-milk may flow from the inner tub 8 to the cup 6 to a level situated above the connection sprout 17. In the upper position of the cup the connection sprout 17 lies above the maximum level Smax in the tub 8, so that in this position the feeding-milk received in excess from the tub 8 in the previous position may flow back to the inner tub until the level in the cups has been lowered to the lower edge of the connection sprout 17. It is evident that the cups 6 have to be secured at the correct height in the straps 20 and that the stroke of the up and down movement of the cups has to be greater than the difference in the levels Smax and Smin in the tubs 8. With each downward and thereafter upward movement of the cups 6 they are filled with an equal quantity of feeding-milk. This quantity may be decreased or increased for the younger or older animals by replacing the cups by cups provided with a connection sprout at a greater or smaller distance above the cup bottom, while it is also possible to use a cup construction with a filling tube serving at the same time as an overflow-tube and which reaches through the cup bottom upwards through an adjustable height. By having said tube through a larger or smaller height extend into the cup the level in said cup corresponding to the upper edge of the tube is correspondingly raised or lowered and the quantity of feeding-milk supplied with each downward and again upward movement of the yoke 18 to the cup may be increased or decreased as desired.

In FIG. 3 two tubular support arms 29 extending from both sides of the container 5 are shown on the free ends of each of which a suckling mask 30 with an artificial teat 31 has been mounted, said teat being connected via a flexible conduit 32 to a discharge sprout 33 near the bottom of the relative cup 6. Each suckling mask 30 attends to one or two rows of pens, between which the suckling device is moved.

By keeping the quantity of feeding-milk for supplying the cups 6, kept in storage in the tub 8, comparatively small e.g. between 4 and 5 liters one is certain that the tub content is continuously renewed which is especially important for very young animals. Moreover, measures are taken to keep the feeding-milk homogeneous. Therefor in the tub 8 an agitation member has been provided, constituted by a perforated plate 34, suspended by a rod 35 and a swinging piece 36 with pivots 37 hingedly from support lugs 38 provided between the hinge axes 19 and the end of the yoke 18 supporting the cups 6. With each upward and downward swinging movement of the yoke 18 thereby the perforated plate 34 is taken along downwards and upwards so that the unsolved parts in the feeding-milk are being kept in suspension.

Figure 4:
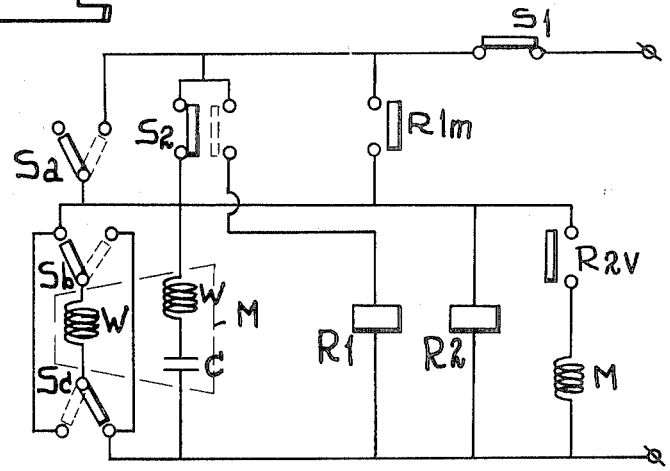
FIG. 4 shows the simplified electrical control diagram of the device.

Now the operation of the above-described device will be explained with reference to the simplified electrical circuit of FIG. 4.

The circuit shown is meant for a situation in which the suckling device moves completely automatically and intermittently in the one direction from suckling station to suckling station, reserves its movement in an end point after the last station and thereafter moves back in the opposite direction without interruption to a starting point prior to the first suckling station in order to reserve its direction in that point again and to move intermittently again along the suckling stations. It is assumed that the main switch $S_1$ is opened and that the carriage 1 stands at rest in the end point prior to the first suckling station, a switching device for reversing the direction of movement of the carriage, shown in the circuit by the switches $S_a$, $S_b$ and $S_c$, is brought by a reversing switching cam provided in the said end point on the rail 4 in the position shown in FIG. 4. Further it is assumed that the cups have been filled with feeding-milk up to the desired level. If now starting from this situation the main switch $S_1$ is closed, then via the switch $S_2$ on the carriage a motor M is energized, said motor being indicated in the circuit shown by its main and auxiliary windings Ww and a capacity C, whereby the carriage is moved in the direction of the first suckling station, where on the rail 4 a switching cam 40 is provided moving the switch $S_2$ from the position indicated by full lines to the position indicated in broken lines, whereby the motor is switched off and the carriage 1 stops at this station, so that the calves in this station have the opportunity to empty the cups 6. The periods of dwells of the carriage 1 at each suckling station is determined by the retardation time of the relay $R_1$, the energizing circuit of which has been closed by the switch $S_2$ in its position shown in broken lines at the stopping moment of the carriage 1. After the retardation time of e.g. a couple of minutes the relay $R_1$ is energized and closes a corresponding relay contact $R_1m$, whereby via this contact the motor circuit is again closed and the carriage starts moving to the next suckling station. The switch $S_2$ is then freed by the switching cam of the first suckling station and returns to its position according to FIG. 4 to take over the temporary function of the relay contact $R_1m$. Together with the starting again of the motor M the energizing circuit of a second time-relay $R_2$ is closed, whereby via a corresponding relay-contact $R_2v$ the coil $M_1$ of the electromagnet 27 is energized. The energization of the coil $M_1$ results in moving the cups to their lower position to be again filled from the container 5. The energization of the coil $M_1$ is interrupted as soon as the retardation time of the relay $R_2$ has passed, so that the relay contact $R_2v$ is broken. The cups 6 then return to their upper position. The retardation time of the relay $R_2$ has been chosen such with reference to that of the relay $R_1$ that the cups at the moment in which the carriage has stopped at the next suckling station by actuation of the switch $S_2$ by the switching cam belonging to said suckling station have already returned to their upper position. The cycle just described is repeated until past the last suckling station a return point has been reached wherein the reverse switches $S_a$, $S_b$ and $S_c$ moved by a reverse switching cam provided in that point on the rail 4 are moved from the position shown in FIG. 4 with full lines to the position shown in broken lines, whereby the direction of flow through the main winding W and thereby the direction of the rotation of the motor M are reversed. With the reverse switches $S_a$, $S_b$ and $S_c$ placed in the broken line position the motor M remains energized until the carriage has returned to its starting point, wherein said switches are again moved to the full line position of FIG. 4.

It is evident that the carriage 1 might also be moved intermittently through a cow-house along an endless path.

With the above-described device one may, if desired, also carry out the suckling according to a system, in which each animal is able to drink at will in a predetermined time. Therefor the hose 32 of the relative cups 6 might be disconnected and directly attached to the projecting end of the tube 15, so that the animals may then be fed directly from the container 5. In that case it is also possible to simply lower the cups 6 so far in the strap 20 that the connecting sprout 17 of the cup permanently stays below the level in the inner tub 8, so that a continuous supply of feeding-milk takes place from the tub 8 to the cup. As an illustration in FIG. 1 the right cup has been shown in such a lowered position.

I claim:

1. A device for suckling animals by means of a carriage intermittently movable along a row of suckling stations, comprising a supply container, at least one cup having means providing flow communication with the interior of the supply container and having a bottom part connected by tubular means to feeding means whereby an animal may feed therefrom, means for moving said cup vertically relative to said container between lower and upper positions, said cup being formed with a supply opening which in a lower position of the cup lies below the minimum container content level, said supply opening in the upper position of the cup being located above the maximum container content level.

2. A device according to claim 1, wherein a plurality of cups are supported by a unitary pivotally mounted yoke, each of said plurality of cups being connected by a flexible conduit to the supply container.

3. A device according to claim 2, wherein said plurality of cups are pivotally mounted to one end of said yoke, said other end of said yoke constituting a counterweight.

4. A device according to claim 2, characterized in that said cups are mounted on the yoke for vertical adjustment relative thereto.

5. A device according to claim 2, wherein agitation means is provided within the container for agitating the container contents and being coupled to said yoke for movement therewith.

6. A device according to claim 12, wherein said agitation means is pivotally mounted and operatively connected to said yoke in a region between said one end of the yoke and the point of pivotal connection of said yoke.

7. A device according to claim 8, wherein the supply opening formed in the cup is constituted by one end of a supply tube the other end of which communicated with the interior of said container.

* * * * *